United States Patent [19]

Jolissaint et al.

[11] Patent Number: 5,265,157
[45] Date of Patent: Nov. 23, 1993

[54] ANSWER SUPERVISION AND SERVICE SELECTION

[75] Inventors: C. H. Jolissaint, Sunnyvale, Calif.; Gregg W. Kerlin, Los Gatos, Calif.

[73] Assignee: International Business Machines Corporation, Armonk, N.Y.

[21] Appl. No.: 598,487

[22] Filed: Oct. 16, 1990

[51] Int. Cl.5 .............................................. H04M 3/00
[52] U.S. Cl. ..................................... 379/386; 379/94; 379/164; 379/257; 379/100
[58] Field of Search .................... 379/97, 98, 386, 164, 379/165, 94, 100, 257, 202, 204, 205

[56] References Cited

U.S. PATENT DOCUMENTS

| | | | |
|---|---|---|---|
| 4,219,699 | 8/1980 | Nilssen et al. | 379/204 X |
| 4,754,478 | 6/1988 | Leibersberger et al. | 379/204 |
| 4,809,321 | 2/1989 | Morganstein et al. | 379/386 |
| 4,995,073 | 2/1991 | Okata et al. | 379/94 |
| 5,062,133 | 10/1991 | Melrose | 379/94 |
| 5,073,922 | 12/1991 | Okada | 379/164 |

Primary Examiner—James L. Dwyer
Assistant Examiner—Paul A. Fournier
Attorney, Agent, or Firm—Leslie G. Murray

[57] ABSTRACT

Apparatus and method for communicating a call answered event and other communication services selection information to a call originating device (telephone). Tone signalling technology (DTMF) is used to indicate call progress. DTMF signals are generated by the switching system or associated telephony equipment.

17 Claims, 2 Drawing Sheets

ANSWER SUPERVISION AND SERVICE SELECTION

FIELD OF THE INVENTION

This invention generally relates to improvements in telephone call processing and more particularly to inbound and outbound call management for automated call processing.

BACKGROUND OF THE INVENTION

Many business applications can be automated with voice processing technology. A business can use voice processing equipment to call its clients and deliver or solicit information. Alternatively, business customers can call into a firm's voice processing unit to obtain information, place orders, or transfer to human service agents or other response equipment. Other applications can employ voice processing equipment to exchange information with other call handling equipment without human intervention.

In most cases, the call originating or call transferring automated equipment must detect when the target called party has answered in an effective non-intrusive manner so as to effect a smooth and quick exchange of information from caller to called parties. This invention provides a process for communicating the call-answered event, commonly referred to as answer supervision, to call originating equipment by using existing tone signalling technology, Dual Tone Multi-Frequency (DTMF). The switching equipment or the called equipment will send inband DTMF tone(s) to the calling equipment unit when the called party has answered.

While other methods exist for detecting that a called party has answered, this approach permits existing voice processing technology to positively identify in-band call answering. The invention also extends the format of the answer indication to cover the selection of the form of information exchange the calling equipment will obtain from the called equipment when the latter offers connection services to various devices (FAX Modem, Voice Messaging, Data Modem, Phone and others).

This invention relates to improvements to inbound and outbound call handling for automated call processing equipment which enhances the speed and certainty of detecting call answer for equipment dependent on in-band signalling methods for determining the state of a call. The automation of call handing has exploded in recent years with the rise of customer services offered over the telephone by institutions and the replacement of human telephone operators with automated attendant machines. These systems have been used by business, government, education, and other segments to provide information to clients through the telephone. The equipment reduces the cost of providing services both by replacing human agents and minimizing the expense of each phone call by shortening the time each is handled.

The application of this call handling technology can be divided into two functional areas:

(1) call processing; and
(2) inbound and outbound calls.

Inbound calls are placed by a client from a remote location to the service provider location (residence to business, business to business). The automated equipment answering the call on occasion must 'transfer' the call to a human agent or alternate automated system. In some applications, the transfer process is not complete until the automated system knows the agent has answered.

Outbound calls are placed by a service provider to a client. For example, business to residence, business to target business phone. Typical applications for automated dialling include telemarketing and message notification. When the called party answers the phone, the dialling equipment must detect the call has been answered, and either deliver the message or rapidly transfer the call to another phone (human agent or automated system).

Early technology could not determine if the call was answered. An indirect method of detection relied on the calling or transferring apparatus to detect that ringing had stopped. No signal was sent by the called party or the switching system to the calling unit to indicate answer. Several seconds would pass before the calling apparatus determined that ringing had stopped. This delay meant the called party would hear silence upon answering, and then hang up.

In recent years, other methods of answer detection were created, but not without certain restrictions. One popular approach is voice detection, which allows the calling or transferring unit to detect the call has been answered by the presence of voice energy on the line. An advantage of this method is the ability to associate long, continuous voice energy with a home answering machine. The disadvantage is that the person answering the phone may not speak long or loud enough to be quickly detected as having answered. This technique would also be inferior to the alternatives disclosed in the subject invention when considering situations where the called party is another automated call processing apparatus.

Yet another form of answer supervision detection is a signal provided on an out-of-band channel; a communication channel outside of the communication channel carrying the information or voice between calling and called points. The fact that a phone device has answered is absolutely known to the switching system (central office, or pbx) to which it is attached, and this switch can signal the answered state to other switches over a communication network which is out-of-band. Currently, telephone network service providers send this information to automated equipment directly attached to the network over designated lines (trunks) supporting the reception of answer supervision using E & M signalling or ISDN D-Channel messages.

If the automated equipment doesn't support these channel connections, or is separated from them by switching systems not conveying the information, then out-of-band methods do not solve the problem. For example, voice response technology connected to analog phone ports on some PBX equipment, by far the most common form of attachment, do not receive this information from the PBX even when it has received it from the telephone network.

OBJECTS OF THE INVENTION

The invention provides a method for obtaining answer supervision in-band as a DTMF tone provided by the called equipment, the network provider, or local switching element depending on application. Voice processing technology has grown in functionality in recent years to extend beyond just delivering and accepting voice messages and DTMF data input from callers. Enhancements to equipment include image and data transmission (facsimile and ascii data modems) to supplement information exchange with the caller. Often this equipment returns facsimile information to the caller via another phone connection, and recently new products offer it within the same phone connection. Once the human agent has made a choice to connect to the called equipment service, the connection is fixed to that service.

The subject invention provides a means for voice processing equipment to detect when other voice processing equipment has answered. It also provides means for rapidly determining the services the features of the called voice processing equipment provide by employing in-band DTMF tones, for example, facsimile, voice message storage, data modem connection and, phone transfer Thus, the voice equipment can then make a selection by sending the called equipment a DTMF signal and switch itself to a compatible form of information exchange (facsimile to facsimile, voice message to voice message, data to data).

At any time, the calling voice processing equipment can send DTMF tones to the called equipment and interrupt the data exchange to select an alternative service if available at the called equipment. It is envisioned that this solution will provide a routine and rapid method for exchanging information where business systems need to share data in an automated manner over the telephone voice network.

The foregoing problems are overcome and the object of the invention is realized by a method and apparatus for providing call answer indication to a calling party. The method includes a step of transmitting a DTMF digit as a signal. The DTMF digit is transmitted when the called party has answered. For example, a single digit "*" indicating the call has been answered.

The invention extends the use of DTMF digits for call answer indication to ISDN Trunk Adapter equipment, network switching equipment, PBX equipment, and end-point devices. The invention also extends the format of the answer indication to include information provided by terminating automated equipment on available connection services, and call originating equipment in requesting those services.

For example, an automated apparatus, Voice Response Unit (VRU), calling the automated apparatus (VRU) with one or more service connections (FAX, DATA MODEM, VOICE MESSAGING, PHONE or other communication connection) receives answer indication from the called apparatus or telecommunication network using a "*" digit, followed by Service Provision Codes (SPC) indicating the available connections.

The format for this service offering is *SPC*, where the SPC codes are DTMF digits representing the service choices, and the final "*" indicates the end of the codes list. The call originating apparatus then responds to the answering apparatus by transmitting the DTMF digit sequence *SSC* inband to the answering apparatus, where the first '*' indicates the beginning of the Selected Service Code, the SSC is a single set of digit(s) indicated the selected connection, and the final * indicates the calling unit is ready for connection to the service. The called unit makes the connection to the service whether the service is integral to, attached to, or externally switchable (transfer) to the target communication connection.

An embodiment of the answer supervision method and apparatus enables a PBX or CBX to receive called party answer supervision and provide the information to customer business applications. This embodiment includes a trunk adapter with an ISDN primary or basic interface 20A of FIG. 1 that receives called party answer supervision from a network provider. The trunk adapter, in response to the network indication, outpulses DTMF signals over a T1 interface through the PBX 14 to a voice response unit 14A. The VRU 14A subsequently takes pre-determined action such as playing a message (prompt) or transferring the call as determined by the customer business application. If the transfer process does take place, it is also possible for the PBX or CBX to send a DTMF tone "*" to the voice processing unit at the point at which an agent has answered the phone. This process facilitates disconnection of the voice processing unit from the call. The action in turn causes the CBX to connect the call to the agent phone.

DETAILED DESCRIPTION OF THE INVENTION

Answer Supervision Protocol

The subject of the first four embodiments of this invention cover the use of a novel protocol for providing answer supervision to calling equipment by use of a single DTMF digit, the star '*' digit.

Figure 1:
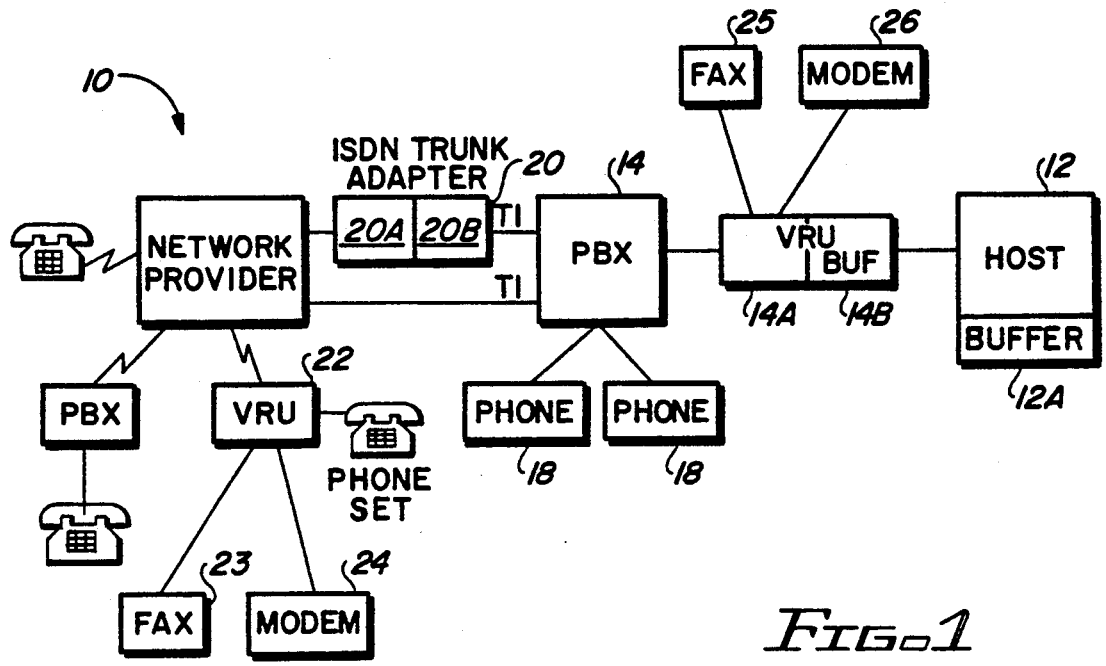
FIG. 1 is a system diagram of the apparatus in accordance with the subject invention.

Referring to FIG. 1, a block diagram of a telephony system in accordance with the present invention is illustrated. The telephony system is a Host Notification System (HNS) 10 includes a host processor (HOST) 12 that may be coupled via a standard datastream session to a Voice Response Unit (VRU) 14A. The VRU 14A telephony interface is attached to a local telephone exchange or a Computerized Branch Exchange (CBX). The Host 12 includes a memory 12A that comprises a temporary RAM and a mass storage device, such as a magnetic disk or magnetic tape unit.

Apparatus in accordance with the various elements of the functional blocks is disclosed in commonly assigned U.S. Pat. No. 4,805,209, issued Feb. 14, 1989. The disclosure of U.S. Pat. No. 4,805,209 is incorporated by reference herein in its entirety. Although the ensuing description is made in reference to a hardware and software system as described in U.S. Pat. No. 4,805,209 it should be realized that the teaching of the invention is not limited for use with only such a system and that, instead, the teaching of the invention is applicable to a large number of possible hardware and/or software embodiments.

The Host 12 may be a type of IBM System/370 processor, a description of which is found in a document entitled "S/370 Reference Summary, GX20-1850", published by the International Business Machines Corporation. While the Host 12 in a presently preferred embodiment of the invention is embodied in a S/370 processor it should be realized that the invention can be practiced with other mainframes, minicomputers or microprocessors.

The PBX 14 may be a PBX known in the art as a ROLM 8000 or a ROLM CBX II 9000, a description of which is found in a document entitled "ROLM CBX II 9000 Business Communications System", published by the ROLM Corporation (1986). It should be realized however that the invention can be practiced with other varieties of PBX or CBX equipment and in general with any PBX that supports outbound calls. An embodiment of this invention requires the PBX to be enhanced to include the detection of answer supervision signals on T1 E&M trunk interfaces, other embodiments require the PBX to generate a DTMF tone to signal answer supervision to call originating equipment on that same PBX.

A Voice Response Unit (VRU) 14A, such as a type known in the art as an IBM 9270, is coupled between the PBX 14 and the Host 12. VRUs, such as the IBM 9270, may be employed to place telephone calls through the PBX to the Network and finally to a residential or business phone. The VRU 14a plays prerecorded voice messages or prompts to the called party 18 and accepts caller phone access to Host 12 data by using Dual Tone Multiple Frequency (DTMF) input with voice responses. Finally, the VRU 14A employs PBX 14 features such as call transfer in order to transfer the called party to an agent if further assistance is required.

In accordance with a first embodiment of the invention there is also coupled to PBX 14, via a T1 tie link, a trunk adapter 20 that interfaces the PBX 14 to an ISDN phone trunk. The trunk adapter 20 may be a type known in the art as an IBM 9757. The phone trunk couples the PBX 14 to the network provider's switch (not shown) that transmits the answer supervision signal to the PBX. The answer supervision signal is generated by the end-point switch in the network to which the called party is attached, and this signal is initiated when the called party's phone is taken off-hook (answered).

In accordance with this embodiment of the invention the trunk adapter 20 includes an ISDN primary or basic interface 20A that receives the answer supervision information from the network provider's switch. The format of this information is in accordance with ISDN D Channel Signalling as defined by CCITT Standards Vol. III (ISDN 92-61-02081-X).

Information is buffered (BUFF 20B) by the trunk adapter 20 and subsequently outpulsed as a DTMF signal. The outpulsing of the answer supervision information is provided immediately upon reception of the network D Channel Signal. The outpulsed information is transmitted in accordance with the protocol of the invention over an immediate start T1 tie through the PBX 14 and to the VRU 14A.

VRU 14A subsequently takes appropriate steps in offering voice responses and accepting called party DTMF input according to the application program controlling the VRU. Included in these subsequent actions is the possibility of the VRU providing answer supervision information to a Host 12 and/or transferring the call to an agent. As such, no modification of the PBX 14 is required in that the PBX 14 is essentially "transparent" to the DTMF tones that are used to convey the answer supervision information from the trunk adapter 20 to the VRU 14A.

In an embodiment of the invention, each DTMF tone has a duration of eighty milliseconds and is separated from other tones, if present, by intervals of eighty milliseconds.

In accordance with a second embodiment of the invention the network provider's switch employs a T1 trunk and DTMF tones in conjunction with the novel protocol of the invention to provide answer supervision information as DTMF signals. This information passes though the PBX 14 to the VRU 14A. In the second embodiment the functionality of the trunk adapter 20 may be considered to have been moved "upstream" and incorporated within the network provider's switch.

In accordance with a third embodiment of the invention the PBX 14 employs the answer supervision information provided by the network on a T1, or two or four wire E & M trunk, to the PBX, and the PBX converts the information into DTMF tone(s) sent to the VRU 14A.

In accordance with a fourth embodiment of the invention, the VRU 14A may, subsequent to receiving answer supervision information, from any source, employ PBX 14 features such as call transfer to transfer a call to an agent. As such, the transferred call can also be considered as an outbound call within the PBX 14. Consequently, PBX 14 can generate answer supervision information to the VRU 14A based on its own determination that the agent's phone has been answered.

An agent's phone is attached to PBX 14. This improves upon other methods known in the art, such as that found in copending application, Ser. No. 07/432,123, describing how the VRU 14A determines the transfer call has been answered by detecting the agent's voice or a DTMF tone generated by the agent's telephone keypad. The invention frees the agent of the additional step of dialing or speaking distinctly upon answering to render a successful transfer. Furthermore, the invention overcomes a possible mistaken interpretation by VRU 14A that an Automatic Call Distribution (ACD) queue's recording is an agent, when the transfer is to ACD agents.

The invention provides a novel protocol that allows answer supervision information to be obtained by any VRU over telephony interfaces which do not support out-of-band signalling. Furthermore, no changes are required to the existing VRU interface. The protocol on the VRU 14A side of the connection is standard DTMF signals on analog PBX line interfaces and is normal functioning for VRUs. On the call switching side of the connection, protocol changes are made. The four embodiments of the invention relate to the PBX or network side of the VRU 14A. A first embodiment uses the trunk adaptor 20 to interface the PBX with standard E&M T1. A second embodiment requires that the network switch implement the protocol.

A third embodiment requires that the PBX implement a protocol converting a network answer signal to DTMF. The fourth embodiment requires the PBX to implement a protocol for its own internal lines answering calls transferred by a VRU device.

As such, all of the embodiments require the protocol providing equipment to recognize calls originated by the VRU and distinguish these calls from other call origination sources (such as agents), so as to provide supervision information as DTMF signals only to VRU-generated calls. Agent or PBX callers do not desire in-band DTMF answer supervision information tone. This identification is done by the PBX using Class of Service numbers assigned to the call originating extension (VRU, agent). The identification is done by the trunk adaptor and/or by the network by pre-determined assignment of the outgoing trunks, lines, or channels that the VRU would use.

Figure 2:
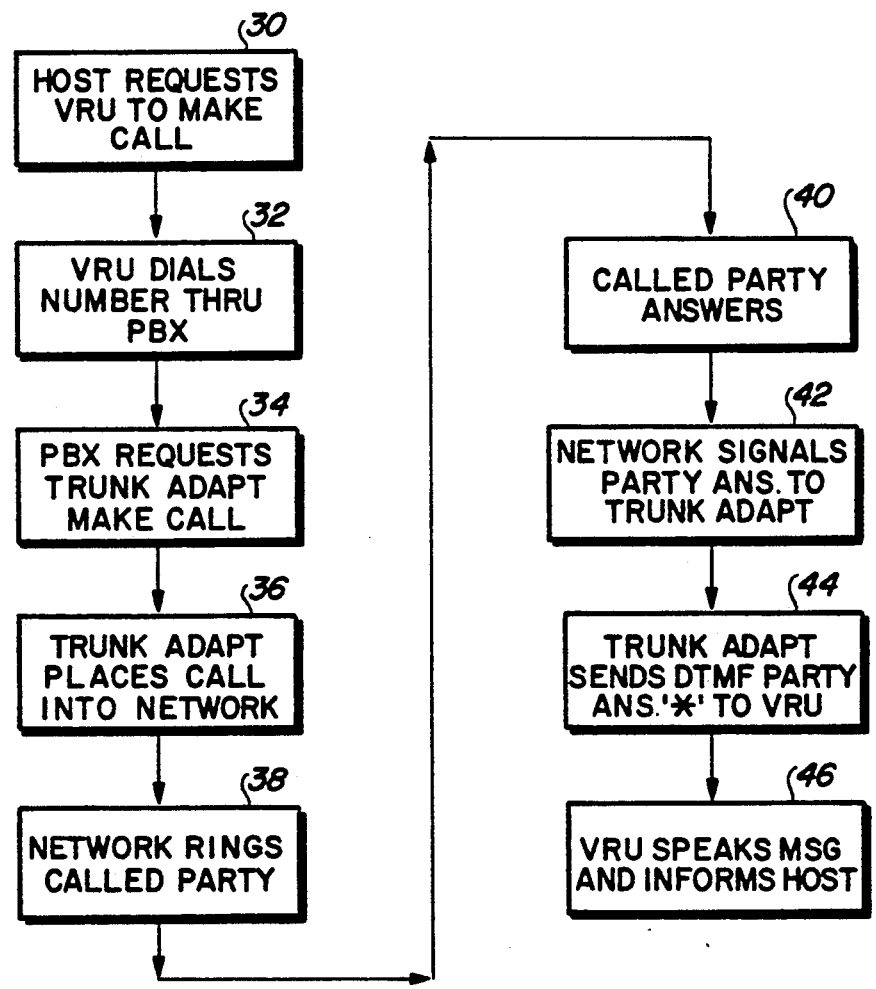
FIG. 2 is a flowchart of the method in accordance with the subject invention.

As depicted in the flowchart of FIG. 2 an embodiment of the invention requires a Host 12 selection of a target phone number to call and offer information to the called party (hotel reservation confirmed, product arrived). The Host 12 signals the VRU 14A to dial the target phone number by sending a screen or data block to the VRU 14A via data communications protocols and data streams. For example, 3270 datastream on LU2.0 SNA (BLOCK 30). The VRU 14A goes off-hook on the interface to the PBX 14 and outpulses the target phone number to the PBX 14 (BLOCK 32). Therefore, PBX 14 routes the outgoing call to a trunk or trunk group designated to handle VRU originated outbound calls. PBX 14 seizes the outgoing trunk interface and sends the target number to the trunk adaptor 20 for example (BLOCK 34).

Trunk adapter 20 makes a request to the ISDN network to complete the call (BLOCK 36). The network rings the called party and the trunk adaptor monitors the calls progress, providing ringing or busy tone to the VRU 14A as appropriate according to the network information the trunk adaptor receives on the out-of-band 'D' channel (BLOCKS 38 and 40). If the target phone answers, the network signals the trunk adapter 20 with an answer supervision message (BLOCK 42). The trunk adaptor 20 sends an inband DTMF '*' digit to the VRU 14A transparently through PBX 14 (BLOCK 44).

VRU 14A detects the '*' digit and takes appropriate action as mentioned above, including informing the Host 12 that the call was answered (BLOCK 46). If the VRU 14A does not receive a '*' digit within a configurable timeout period, then the VRU 14A may terminate the call. If the VRU 14A does not receive a '*' but does detect voice energy, then it will stop waiting for the '*' digit and proceed with the next application step. The trunk adaptor facilitates the insertion of DTMF protocol answer supervision information into the in-band channel for the duration of eighty milliseconds.

Service Selection

The invention incorporates an extension to the answer supervision protocol allowing automated telephony equipment to exchange DTMF tones to establish:

(a) the forms of connection available from the called equipment;
(b) the selection of the connection service by the calling equipment from the called; and
(c) a command from the calling equipment to the called equipment to end a service and resume a new selection.

Exchange service provisions, service selection, and service termination are provided within the protocol.

Figure 3:
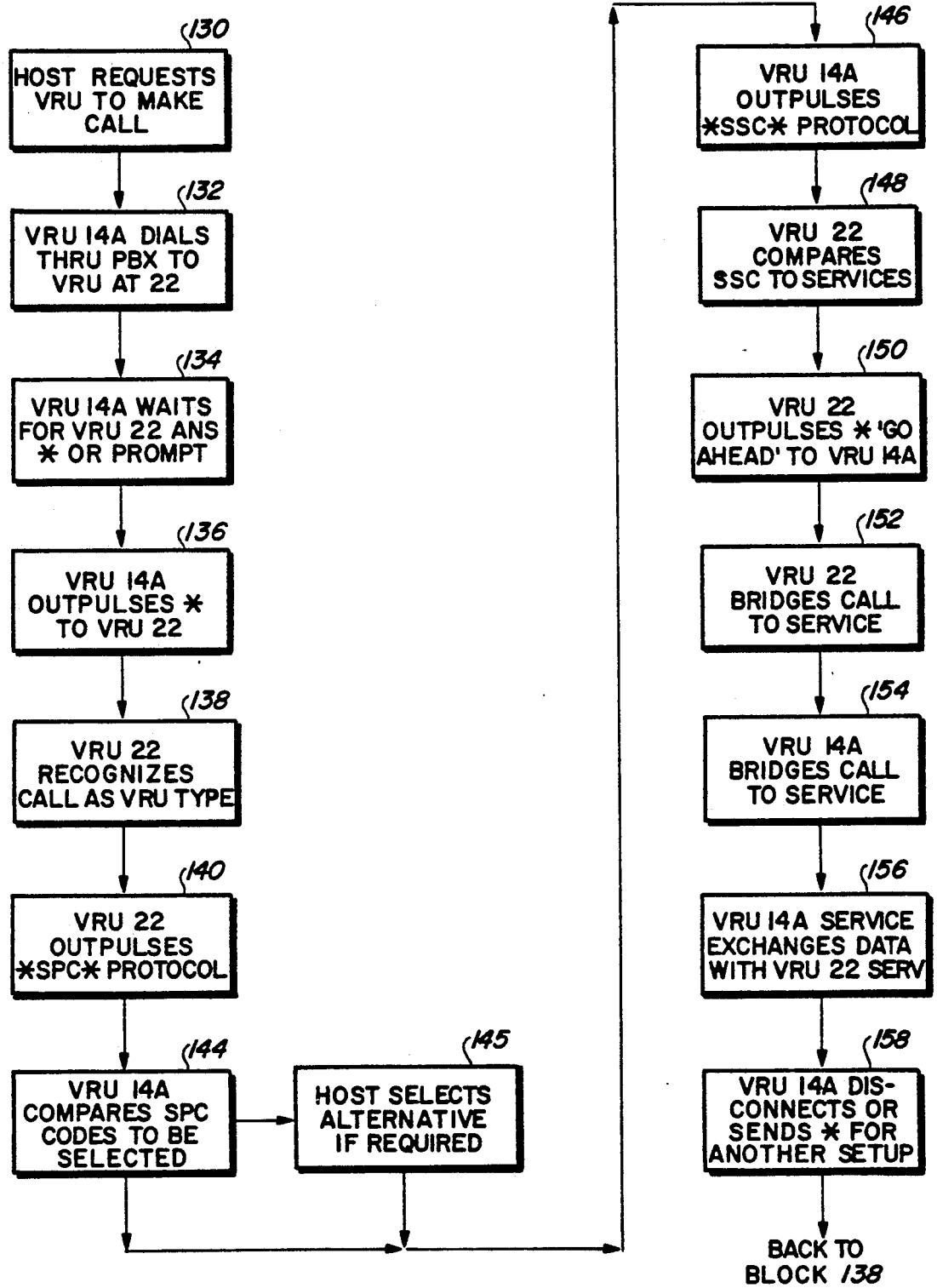
FIG. 3 is a flowchart of the method in accordance with the subject invention.

FIG. 3 illustrates in block diagram form an information delivery system implementing the teachings of this embodiment of the invention. The system is derivative in concept to call service selection within ISDN digital channel protocols defining the identification of call type and services required to handle call connection and addressing. The invention embodies this concept in an inband DTMF protocol as opposed to the highly structured ISDN 'D' channel out-of-band protocol.

In accordance with a fifth embodiment of the invention the target telephony equipment 22 (FIG. 1), called by the VRU 14A, answers the call with a DTMF tone according to the novel protocol set forth in the invention (BLOCK 130 to BLOCK 134). Another example of call processing is the answering telephony equipment 22. It could be another VRU similar to VRU 14A.

Here the protocol is extended beyond a single star '*' digit to include additional answer supervision information indicating the forms of connection services the terminating device offers automated calling equipment.

As such, the answering equipment 22 responds to a ringing line by going off-hook (answering) and immediately outpulsing the novel protocol answer digit '*' (BLOCK 134) and plays a voice greeting in case the calling party is a human agent.

VRU 14A detects the answer signal from VRU 22, and sends a star '*' digit back to VRU 22 indicating it is an automated device calling (BLOCK 136). The VRU 22 detects the '*' from VRU 14A, and recognizes the call as an automated call (BLOCK 138). Then, the VRU outpulses a novel protocol for Service Provision Codes (SPC) as *SPC* through the network and PBX directly to the VRU 14A as DTMF tones (block 140). The calling VRU 14A detects the first * as the start of the service group, and stores the remaining SPC digits in a temporary memory buffer (14B) until VRU 14A receives the second * digit indicating termination of outpulsing by the called VRU 22.

SPC digits are structured according to the following format to indicate available connection services by VRU 22 to other equipment or to elements within VRU 22. The VRU 22 uses its own switching capabilities: code '#', service code, '#', service code, '#', and so on up to the limit of services available, where the service code is a one, two, or three digit representation of the service, and the '#' digit is a delimiter between service codes. For example, service code one can be voice messaging, service code two FAX modem, service code three Data Modem, and service code four phone ringdown. The response by VRU 22 to the call by VRU 14A would be *1#2#3#4* for this discussion.

As such, VRU 14A compares the available services from VRU 22 with the service requested by the Host 12 using the logical procedures commonly present in VRU application programs (BLOCK 144). If a match occurs between the Host requested service and the VRU 22 services, then VRU 114A outpulses the novel service selection protocol as described below (BLOCK 146).

If a match does not occur between the Host selected service and the VRU 22 service code list, then the VRU 14A can send the VRU 22 service codes to Host 22 using standard datastream communications. Application programs resident in the Host 22 determine if another connection service between VRU 22 and VRU 14A is desirable or available.

If a desired service is not available, Host 22 can inform VRU 14A to hang up on the call with VRU 22. If an alternative is available, then Host 22 sends its second selection request to VRU 14A using standard datastream communications (BLOCK 145). Thereafter, VRU 14A outpulses the selected service to VRU 22 according to a novel protocol set forth in this invention having the format *SSC*. The protocol uses the first '*' digit as a response to VRU 22. The SSC digits are used as the selected code number, and a final '*' digit indicates the end of selection (BLOCK 146).

VRU 22 receives the *SSC* protocol, compares the single SSC code to its service list (BLOCK 148). If a match is found, VRU 22 outpulses a '*' digit to VRU 14A to prepare to receive service (BLOCK 150). VRU 22 makes a switched connection to the device supporting the particular service code using internal switching capabilities of VRU 22 such as referral lines or matrix switch connections and bridges the connection to monitor the exchange (BLOCK 152).

VRU 14A having detected the 'go ahead' from VRU 22, also concurrently connects a line to its service using referral lines or matrix switch connections and bridges the call (154). VRU 14A service device exchanges data or voice with the VRU 22 service device as appropriate to the service (BLOCK 156). Examples of such service to service connections are FAX Modem 23 to Fax Modem 25; or data modem 24 to data modem 26; or phone set to Phone 18.

When transmission of information has been completed between both services, the service hangs up, and VRU 14A and VRU 22 hang up. If the VRU 14A or Host 12 ends service-to-service transmission, the VRU 14A sends another '*' digit to inform the other VRU to stop sending (BLOCK 158) and switch over to service selection again block (138).

This invention does not require VRU 22 to answer with a '*' digit. However, it enhances the speed of the call slightly and ensures that an automated, not human, answer device has been reached.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. Apparatus for automatically processing calls between a plurality of devices in a telephony network, comprising:
   first generating means for generating a first dual tone multifrequency (DTMF) tone indicative of a call connect state;
   first transmitting means for transmitting said first DTMF tone in response to an incoming call transmitted to a first device by a second device, said first generating means and said first transmitting means associated with said first device;
   second generating means for generating a second DTMF tone indicative that said second device comprises an automated device; and
   second transmitting means for transmitting said second DTMF tone to said first device in response to receipt of said first DTMF tone transmitted by said second device.

2. Apparatus as recited in claim 1, wherein said first generating means includes means for generating a DTMF signal indicative of available connection services, said DTMF signal being transmitted to said second device in response to receipt of said second DTMF tone by said first device.

3. Apparatus as recited in claim 2, further comprising selection means associated with said second device for selecting a desired connection service from said available connection service.

4. Apparatus as recited in claim 3, wherein said selection means includes storage means for storing a service code list corresponding to said available connection services.

5. Apparatus as recited in claim 3, wherein said selection means includes comparison means for comparing said available connection services with a requested service.

6. A method for automatically processing calls between a plurality of devices in a telephony network, comprising the steps of:
   generating a first dual tone multifrequency (DTMF) tone indicative of a call connect state;
   transmitting said first DTMF tone in response to an incoming call transmitted to a first device by a second device;
   generating a second DTMF tone indicative that said second device comprises an automated device; and
   transmitting said second DTMF tone to said first device in response to receipt of said first DTMF tone by said second device.

7. A method as recited in claim 6, further comprising the steps of:
   generating a DTMF signal indicative of available connection services provided by said first device; and
   transmitting said DTMF signal to said second device in response to receipt of said second DTMF tone by said first device.

8. A method as in claim 6 wherein said second DTMF tone is indicative that said second device is ready to receive said DTMF signal indicative of available connection services.

9. Apparatus as recited in claim 2, wherein said first generating means further includes means for generating a tone indicative of readiness to receive information associated with a selected available connection service.

10. Apparatus as recited in claim 2, wherein said first generating means further includes means for generating a plurality of tones as delimiters for said available connection services.

11. Apparatus as recited in claim 9, wherein said second generating means further includes means for generating a tone indicative of the end of transmission of information associated with a selected available connection service.

12. Apparatus as recited in claim 2, wherein said first generating means further includes means for generating a tone indicative of the end of said available connection services.

13. Apparatus as recited in claim 2, wherein said first generating means further includes means for generating a tone indicative of retransmission of said available connection services.

14. Apparatus as recited in claim 2, further comprising ISDN means for transmitting said DTMF signal indicative of available connection services.

15. A method as recited in claim 7, further comprising the step of generating and transmitting a plurality of tones as delimiters for said available connection services.

16. A method as recited in claim 8, further comprising the step of generating and transmitting a tone indicative of the end of transmission of said DTMF signal indicative of available connection services.

17. A method as recited in claim 7, further comprising the step of generating and transmitting a tone indicative of retransmission of said DTMF signal indicative of available connection services.

* * * * *